July 12, 1932.  W. B. GRIFFITH  1,866,766
DRY PIPE VALVE
Filed Feb. 14, 1929   3 Sheets-Sheet 3

Inventor:
William B. Griffith
By F. DeWitt Goodwin
Attorney

Patented July 12, 1932

1,866,766

UNITED STATES PATENT OFFICE

WILLIAM B. GRIFFITH, OF AUDUBON, NEW JERSEY, ASSIGNOR TO STAR SPRINKLER CORPORATION, A CORPORATION OF NEW JERSEY

DRY PIPE VALVE

Application filed February 14, 1929. Serial No. 339,754.

My invention relates to improvements in valves, particularly dry pipe valves of the type used in sprinkler systems. Valves of this type comprise a water clapper and air clapper of larger area than the water clapper whereby a low air pressure acting upon the air clapper will hold the water clapper closed against a higher water pressure, as well known in the art.

The object of my invention is to provide a novel means for operatively mounting the air and water clappers within the valve casing, whereby the acton of the air pressure upon the air clapper will maintain a relatively higher water pressure below the water clapper, without increasing the relative sizes of the clappers, thereby permitting the valve casing to be reduced in size; a further object is to provide novel means associated with the air and water clappers for increasing the effective pressure upon the air clapper and transmitting the same to the water clapper, whereby a greater difference between the air and water pressures can be maintained; a still further object of my invention is to so arrange the air and water clappers that the air clapper will act as a lever engaging a fulcrum upon the valve casing for increasing the force exerted by the air clapper upon the water clapper; and a still further object of my invention is to provide an arm for carrying the clappers to and from their seats and pivotally mounting the air clapper upon the arm so that the air clapper in its opening movement will be tilted relatively to said arm and abut against a part of the casing, which latter will act as a latch or stop to prevent the clappers from reseating in case there should be a flow of water in the reversed direction, downwardly through the dry pipe valve, before the clappers have fully opened. These together with various novel features of construction and arrangement of the parts, which will be more fully hereinafter described and claimed, constitute my invention.

Figure 1:
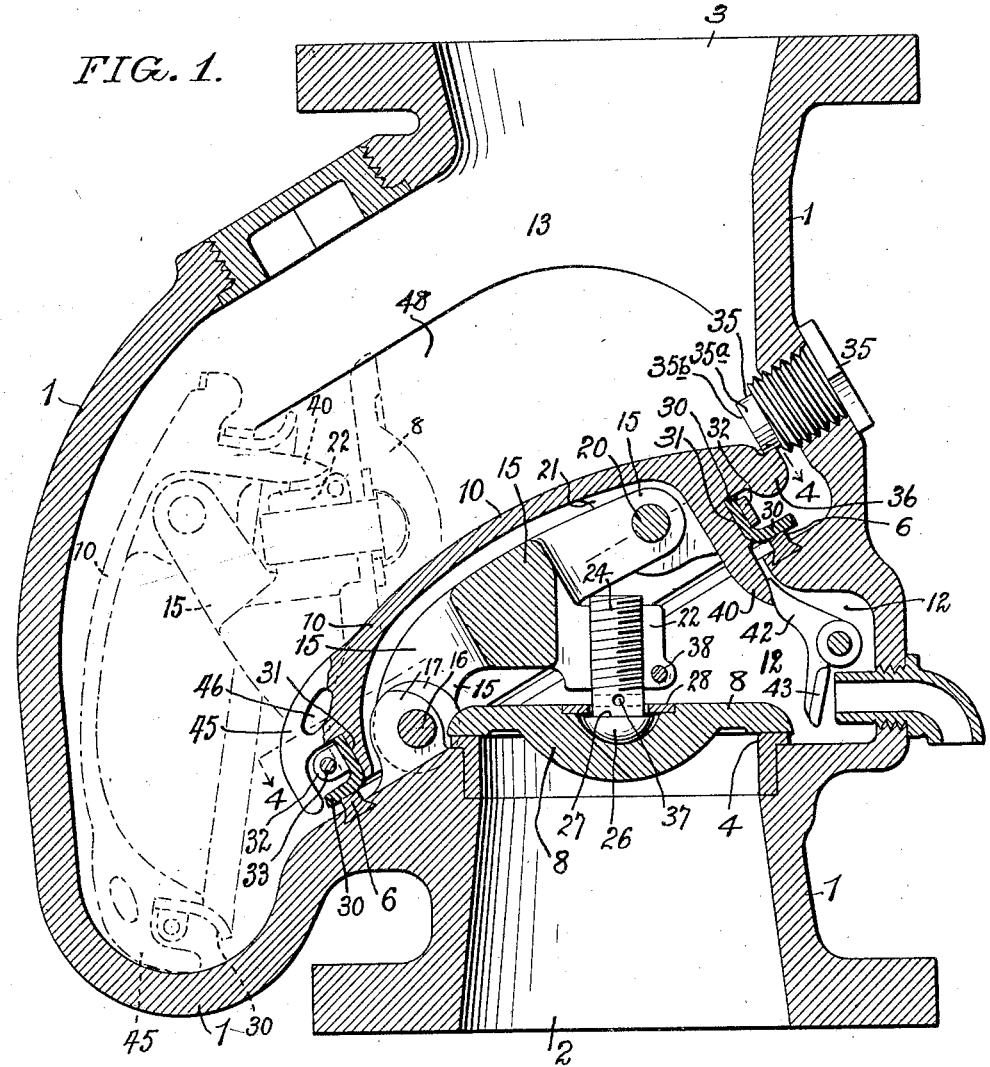
Figure 2:
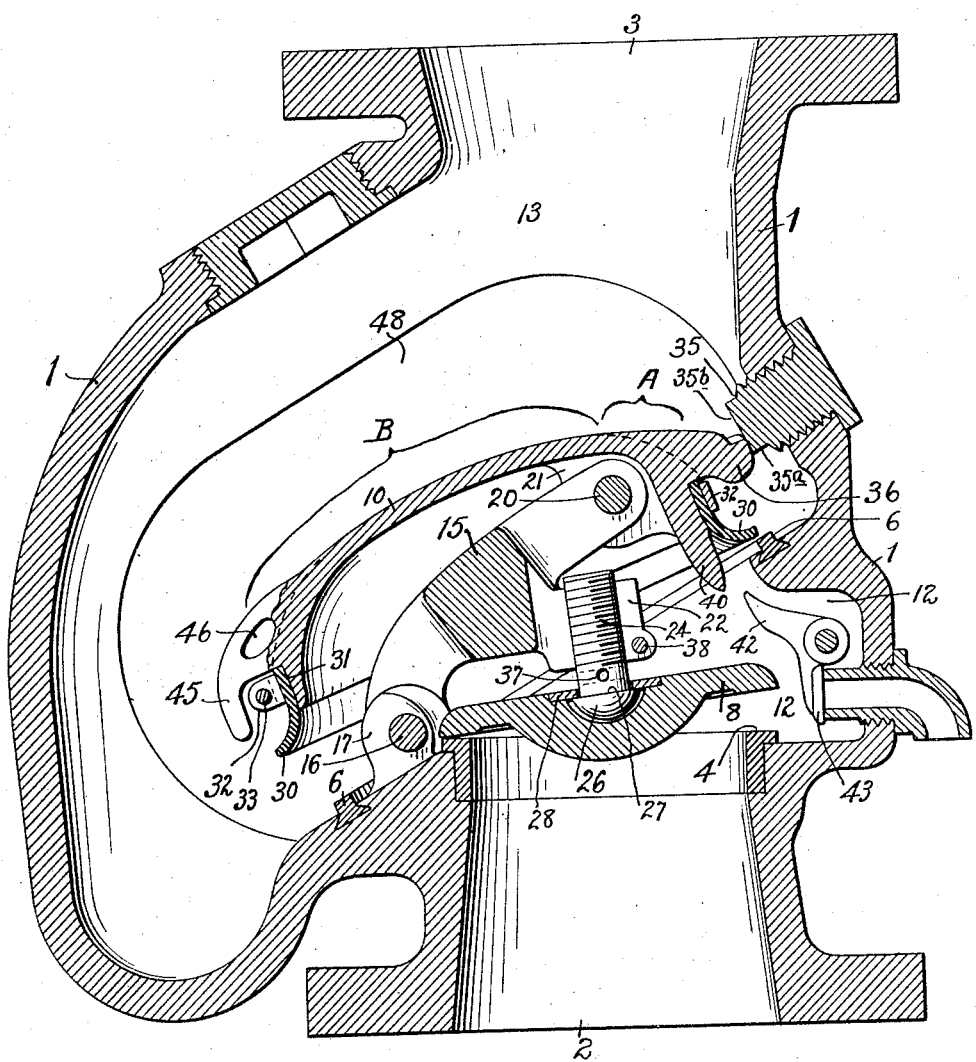
Figure 3:
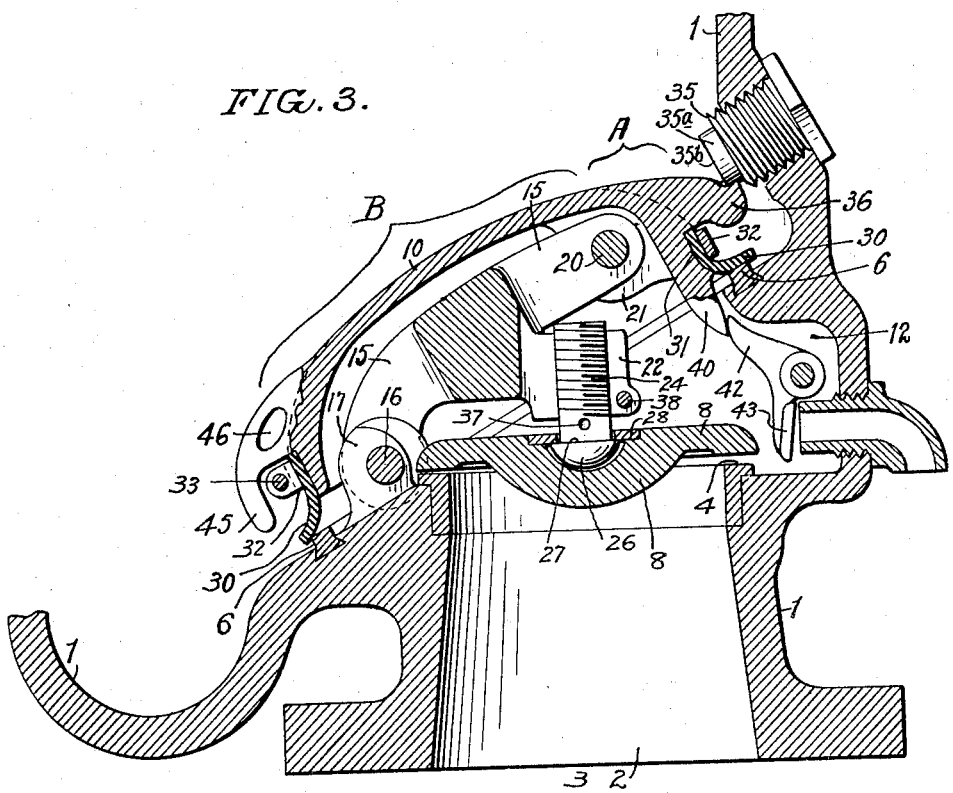
Figure 4:
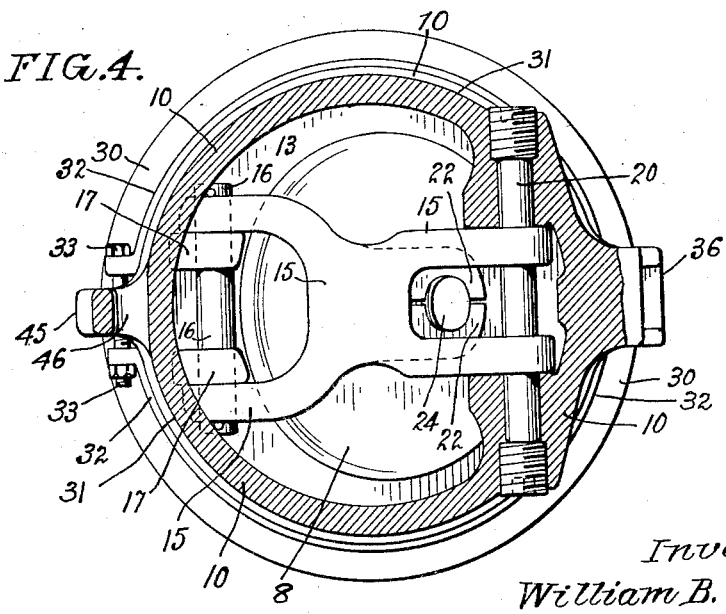

Referring to the accompanying drawings, Fig. 1 is a central vertical sectional view of my improved dry pipe valve showing the clappers in the closed position in full lines and in the open position in dotted lines; Fig. 2 is a view similar to Fig. 1 showing the valve partially opened and locked against reseating; Fig. 3 is a partial sectional view similar to Fig. 1 showing the clappers in the position which they would assume before air pressure forces them into the closed position; and Fig. 4 is a horizontal sectional view as on line 4—4 Fig. 1.

Referring to the accompanying drawings in which like reference characters refer to like parts, 1 represents the casing of a dry pipe valve having an inlet opening 2 and an outlet opening 3. The casing is provided with a water valve seat 4 surrounding the inlet 2, and also an air valve seat 6 surrounding the water valve seat and inclined at an oblique angle to the latter. A water clapper 8 and an air clapper 10 are operatively mounted within the casing and are adapted to swing to and from said seats, as shown in Fig. 1. Between the seats 4 and 6 an atmospheric chamber 12 is formed when the clappers are in the closed position, and an air pressure chamber 13 is formed within the casing 1 above the clapper 10.

An arm 15 is pivotally mounted upon a shaft 16, which in turn is mounted in bearings 17 located upon the casing within the area forming the chamber 12. The free end of the arm 15 is pivotally connected with the air clapper 10 by means of a shaft 20, mounted in bearings 21, formed upon the underside of the air clapper. The arm 15 is provided with a split bearing 22 in which is adjustably secured a bolt 24 having a semicircular head 26 and an enlarged shoulder 27 upon which latter the water clapper 8 is loosely mounted and held by a collar 28 secured upon the clapper 8.

Said collar 28 is adapted to be engaged by the shoulder 27, for lifting the clapper 8 off its seat and also for permitting the clapper 8 to have a slight rocking movement upon the head 26 for insuring the proper seating of the clapper 8.

The air clapper 10 is provided with an annular valve ring 30, formed of flexible material, which is secured upon a cylindrical wall 31 of the air clapper 10 by means of a clamp ring 32 adapted to be clamped tightly around the valve ring 30, by means of a bolt 33. The flexible valve ring 30 will engage the valve seat 6 and close the passageway downwardly through the valve seat 6 when the clapper 10 is in the closed position, shown in Fig. 1, or in the partially opened position, shown in Fig. 3, in which the clappers are supported upon the valve ring 30.

The casing 1 is provided with a removable plug, or abutment part 35, having a cylindrical inner end portion 35a forming a fulcrum adapted to engage a shoulder 36 upon the air clapper 10, so that the air clapper is caused to tilt upon the pivotal connection, or shaft 20, during its initial opening movement, and also during its final closing movement from the position shown in Fig. 3 to the fully closed position, shown in Fig. 1.

The pivotal connection, or shaft 20, is located eccentrically upon the air clapper 10, by which arrangement the upper surface or area of the air clapper, marked "A", in Fig. 3, located between the axis, or shaft 20, and the abutment part 35, will be much smaller than the area marked "B", located upon the opposite side of the shaft 20 relatively to the fulcrum 35.

When the air in the chamber 13 is under pressure it will move the clapper 10 and the arm 15 downwardly, compressing the flexible valve ring 30 until the downward movement of the water clapper 8 is arrested by the valve seat 4, then the air pressure on area "B" of the clapper 10 will tilt the latter upon the shaft 20 until the shoulder 36 takes against the abutment part 35, as shown in Fig. 3. The clapper 10 will then act as a lever, forcing the water clapper 8 tightly upon its seat, as shown in Fig. 1, due to the air pressure acting upon the larger area "B" of the clapper 10.

By positioning the shaft 20 eccentrically to the clapper 10 the arm 15 is of greater length between the shafts 16 and 20, than the distance between the shaft 20 and the part 35, so that the clapper 10 and the arm 15 act as levers and apply an increased force upon the clapper 8. A further gain in leverage is obtained by mounting the clapper 8 upon the arm 15 as shown in the drawings, in which the radius between the shaft 16 and the head 26 carrying the water clapper is shorter than the radius of the arm 15 between the shaft 16 and the shaft 20, where the downward force of the air upon the clapper 10 is applied to the arm 15, thus the water clapper 8 will be held tightly upon its seat and a relatively higher water pressure below the clapper 8 may be maintained by a lower air pressure above the clapper 10, thereby permitting the size of the air clapper 10 to be made smaller relatively to the clapper 8 than has heretofore been possible, and a further result being that the outer dimensions of the casing 1 may be made smaller relatively to the diameter of the inlet opening 2.

By means of the bolt 24 the relative position of the clapper 8 to the arm 15 may be adjusted by inserting a tool in the apertures 37 formed in the bolt 24 for turning the latter, and then tightening the split bearing 22, by means of the clamp bolt 38.

By this adjusting means the clapper 8 may be set so that it will fully seat before the clapper 10 is moved beyond the limit of compression of the flexible valve ring 30, thus preventing the metal part of the clapper 10 striking against the casing adjacent to the valve seat 6.

The plug, or abutment part 35 is made removable from the casing 1 so that plugs having inner end portions 35a of different diameters may be substituted, for varying the relative distance between the abutment part 35 and the plane of the air valve seat 6, thus providing an adjustment for insuring the proper seating of the valve ring 30 upon the air valve seat 6.

When the clappers open due to a reduction of air pressure in the chamber 13, the shoulder 36 upon the clapper 10 is withdrawn from the underside of the part 35, which movement is possible due to the fact that the clapper 10 may tilt upon the shaft 20 and assume a position shown in Fig. 2.

The shoulder 36 will slide around and adjacent to the inner face of the abutment part 35 due to the unbalanced supporting of the clapper 10 on the shaft 20. Should the water flow downwardly after the initial opening of the clappers they will be prevented from returning to their seats by the shoulder 36 abutting against the end surface 35b of the part 35, and form a latch or stop as shown in Fig. 3. The clapper 10 and the arm 15 will form a toggle joint when the shoulder 36 abuts against the end surface 35b of the abutment part 35, thus preventing the reseating of the clappers due to the columning of the water in the system above the clappers 8 and 10.

The clapper 10 is provided with a finger 40, which projects through the plane of the air valve seat 6 and engages a bell crank lever 42, carrying the drip valve 43, which latter is normally held open by the finger 40 when the clappers are closed, as shown in Fig. 1. Said drip valve is allowed to close by its own weight when the clappers are moved to the position shown in Fig. 2, or in dotted lines, Fig. 1.

The initial swinging movement of the clapper 10 about the shaft 20 is limited by the finger 40 engaging the bearing 22, thus insuring the clapper 10 being held in a position relatively to the arm 15, such as shown in dotted lines, Fig. 1, so that the clapper 10 will freely swing through the enlarged portion of the casing 1 into the fully opened position, shown in dotted lines.

The clapper 10 is provided with an enlarged lug 45 which is adapted to engage the inner surface of the casing 1 during the opening movement of the clappers and forms a stop upon which the clapper 10 rests when fully opened. Said lug 45 is provided with a hole 46 for the insertion of a bar or hook for assisting in moving the clappers to the closed position. The casing 1 is provided with a removable hand hole cover 48, making the interior of the casing accessible.

The operation of my improved valve is as follows; when it is desired to set or close the valve, the air clapper 10 is placed so that the shoulder 36 engages the part 35, as shown in Fig. 3, thus closing the valve ring 30 upon the seat 6. Air pressure is then applied to the system above the clapper 10, which pressure causes the clapper 10 to move about the part 35 as a fulcrum, forcing the end of the arm 15 carrying the pivot shaft 20, downwardly, thus forcing the water clapper 8 tightly upon its seat.

By the above described novel arrangement of the clappers and the arm 15 the water clapper 8 may be held closed against a high water pressure by a relatively lower air pressure above the air clapper 10, and the size of the latter may be reduced relatively to the size of the water clapper, thereby permitting a reduction in the entire size of the dry pipe valve casing.

When the air pressure above the clapper 10 is reduced by the opening of a sprinkler head or other means, the water pressure below the clapper 8 causes the arm 15 to tilt the air clapper 10 about the part 35 as a fulcrum. The shoulder 36 is thus withdrawn from engagement with the part 35, as shown in Fig. 2, and the clappers will continue to swing open until they reach the position shown in dotted lines, Fig. 1.

The reseating of the clappers due to a downward flow of water through the casing 1 is prevented by the clapper 10 abutting against the part 35 and locking the clappers in spaced relation with the valve seats.

Various other changes in the construction and arrangement of the parts may be made without departing from my invention.

I claim:—

1. A dry pipe valve comprising a casing having an inlet and an outlet opening, an air valve seat surrounding the inlet opening, a water valve seat surrounding the inlet opening, an arm pivotally mounted upon the casing, an air clapper pivoted upon the free end of said arm adapted to tilt relatively to said arm and movable to and from said air valve seat when the arm is moved, a bearing upon said arm located at a point between the pivotal connection of the arm with the casing and the pivotal connection between the arm and the air clapper, a water clapper mounted in said bearing and movable to and from the water valve seat when the arm is moved, a part located upon the air clapper adjacent to the pivotal connection between the free end of the arm and the air clapper adapted to form a stop normally located in spaced relation with said bearing when the clappers are closed upon their seats, said part positioned and arranged to abut against said bearing, when the clappers are moved from said seats by the arm, for limiting the tilting movement of the portion of the air clapper, located adjacent to the pivotal connection of the arm with the casing, away from the portion of the arm adjacent to the pivotal connection of the arm with the casing, said casing having an abutment part, one side of said air clapper having a portion thereof abutting against said abutment upon the casing in opposition to the opening movement of the air clapper when it is closed, and the pivot connecting the arm and the air clapper being located between the portion of the air clapper which abuts against said abutment part upon the casing and the pivot connecting the arm and the casing.

2. A dry pipe valve comprising a casing having an inlet opening and an outlet opening, an air valve seat surrounding the inlet opening, a water valve seat surrounding the inlet opening, a rigid lever arm pivoted to the casing, an air clapper pivoted directly to the arm and movable therewith to and from the air valve seat when the arm is moved, a water clapper upon said arm located at a point between the pivotal connection of the arm with the casing and the pivotal connection between the arm and the air clapper, an annular wall upon the air clapper having an outwardly presented supporting surface, a flexible valve ring mounted upon said supporting surface of the wall, a split clamp ring embracing the valve ring, means upon the adjacent ends of the clamp ring for contracting the latter around the valve ring for detachably securing the valve ring upon said outer supporting surface of said wall, said casing having an abutment part, one side of said air clapper having a portion thereof abutting against said abutment part in opposition to the opening movement of the air clapper when it is closed, and the pivot connecting the arm and the air clapper being located between the portion of the air clapper which abuts against said abutment part and the pivot connecting the arm and the casing.

3. A dry pipe valve comprising a casing having an inlet opening and an outlet opening, an air valve seat surrounding the inlet opening, a water valve seat surrounding the inlet opening, a lever arm pivoted to the casing, an air clapper pivoted on the arm and movable therewith to and from the air valve seat when the arm is moved, said casing having an abutment part, one side of said air clapper having a shoulder abutting against said part in opposition to the opening movement of the air clapper when it is closed, the pivot connecting the arm and the air clapper being located between said shoulder and the pivot connecting the arm and the casing, and a water clapper carried by the arm and movable to and from the water valve seat when the arm is moved.

4. A dry pipe valve comprising a casing having an inlet opening and an outlet opening, an air valve seat surrounding the inlet opening, a water valve seat surrounding the inlet opening, a lever arm pivoted to the casing between said seats, an air clapper pivoted on the arm and movable therewith to and from the air valve seat when the arm is moved, said arm crossing the water valve seat between its pivotal connections with the casing and the air clapper, said casing having an abutment part, one side of said air clapper having a shoulder abutting against said part in opposition to the opening movement of the air clapper when it is closed, the pivot connecting the arm and the air clapper being located between said shoulder and the pivot connecting the arm and the casing, and a water clapper carried by the arm and movable to and from the water valve seat when the arm is moved.

5. A dry pipe valve comprising a casing having an inlet opening and an outlet opening, an air valve seat surrounding the inlet opening, a water valve seat surrounding the inlet opening, a lever arm pivoted to the casing, an air clapper pivoted on the arm and movable therewith to and from the air valve seat when the arm is moved, said casing having an abutment part, one side of said air clapper having a shoulder abutting against said part in opposition to the opening movement of the air clapper when it is closed, the pivot connecting the arm and the air clapper being located between said shoulder and the pivot connecting the arm and casing, and a water clapper having a movable connection with the arm and being movable to and from the water valve seat when the arm is moved, and the distance between said movable connection and the pivot connecting the arm and the casing being less than the distance between the pivot connecting the arm and the casing and the pivot connecting the arm with the air clapper.

6. A dry pipe valve comprising a casing having an inlet opening and an outlet opening, an air valve seat surrounding said inlet opening, a water valve seat surrounding said inlet opening, a water clapper adapted to close upon said water valve seat, an air clapper, a flexible valve ring upon the air clapper adapted to close upon said air valve seat, an arm operatively associated with said clappers and said casing for guiding said clappers to and from said seats, said air clapper located in spaced relation to and above the water clapper when the clappers are upon their respective seats, a bearing eccentrically positioned upon the arm relatively to the center of the air clapper, a member adjustably mounted in said bearing having the water clapper mounted upon the lower end thereof, said casing having an abutment part, one side of said air clapper having a portion thereof abutting against said abutment part in opposition to the opening movement of the air clapper when it is closed, and the pivot connecting the arm and the air clapper being located between the portion of the air clapper which abuts against said abutment part and the pivot connecting the arm and the casing.

7. A dry pipe valve comprising a casing having an inlet opening and an outlet opening, an air valve seat surrounding said inlet opening, a water valve seat surrounding the inlet opening, a water clapper adapted to close upon said water valve seat, an air clapper, a flexible valve ring upon the air clapper adapted to close upon the air valve seat, a rigid arm pivotally mounted upon the casing upon which said clappers are movable to and from said seats when the arm is moved, a pivotal connection between the water clapper and said arm, a pivotal connection between said air clapper and the free end of said arm, said last mentioned pivotal connection located eccentrically relatively to the center of the air clapper, an abutment part upon the casing located adjacent to the air clapper when said flexible valve ring is upon the air valve seat, and a shoulder upon the air clapper located upon the opposite side of the pivotal connection of the air clapper relatively to the pivotal connection of the arm with the casing, abutting against said abutment part forming a fulcrum in opposition to a movement of said shoulder away from the air valve seat whereby air pressure upon the air clapper will tilt the latter about said part forming the fulcrum and move the arm and the water clapper toward the water valve seat.

8. A dry pipe valve comprising a casing having an inlet opening and an outlet opening, an air valve seat surrounding said inlet opening, a water valve seat surrounding the inlet opening, a water clapper adapted to close upon said water valve seat, an air clapper, a flexible valve ring upon the air clapper adapted to close upon the air valve seat, a rigid arm pivotally mounted upon the casing, a pivotal connection between the free end of said arm and the air clapper, said pivotal connection located eccentrically relatively to the center of the air clapper, an abutment part upon the casing located adjacent to the air valve seat forming a fulcrum adapted to be engaged by the edge portion of the air clapper nearest to said eccentrically located pivotal connection and a pivotal connection between said water clapper and the medial portion of said arm whereby air pressure upon the air clapper will move the latter about said part as a fulcrum and force the arm and the water clapper toward the water valve seat.

9. A dry pipe valve comprising a casing having an inlet opening and an outlet opening, a valve seat surrounding said inlet opening, a clapper, an arm pivotally mounted within the casing adjacent to the valve seat for carrying said clapper to and from said seat, a pivotal connection between said arm and said clapper, an abutment part upon the casing positioned to be engaged by the clapper upon its initial opening movement from said seat for tilting the clapper relatively to said arm into a position to pass said part, and said part positioned upon the casing to be engaged by the clapper in the event of a return movement of the clapper toward the seat and prevent the clapper from reseating by the action of a downward pressure upon the clapper.

10. A dry pipe valve comprising a casing having an inlet opening and an outlet opening, a valve seat surrounding said inlet opening, an arm pivotally mounted within the casing adjacent to the valve seat, a clapper pivotally mounted upon said arm and movable therewith to and from said seat, an abutment part located upon the casing at a point diametrically opposite to said pivot point of the arm with the casing, relatively to the center of the clapper, adapted to be engaged by the clapper in its opening movement from said seat for tilting the clapper relatively to said arm into a position in which the clapper may move past said abutment part, and an abutting surface upon said abutment part against which the clapper abuts in the event of a return movement toward said seat for locking the clapper and the arm in spaced relation with said seat and preventing the clapper from reseating.

11. A dry pipe valve comprising a casing having an inlet opening and an outlet opening, a valve seat surrounding said inlet opening, a clapper, an arm pivotally mounted within the casing adjacent to the valve seat for carrying said clapper to and from said seat, a pivotal connection between said arm and said clapper, an abutment part upon the casing positioned to be engaged by the clapper upon its initial opening movement from said seat for tilting the clapper relatively to said arm into a position to pass said part, said part being located upon the casing adjacent to the edge portion of the clapper which is in alignment with said pivotal connection between the clapper and the arm and the pivotal connection between the arm and the casing, and said part positioned upon the casing to be engaged by said portion of the clapper in the event of a return movement of the clapper toward said seat whereby the arm and a portion of the clapper will form toggle levers when abutting against said part and hold the clapper in spaced relation with said seat against the action of a downward pressure upon the clapper.

12. A dry pipe valve comprising a casing having an inlet opening and an outlet opening, an air valve seat surrounding said inlet opening, a water valve seat surrounding said inlet opening, a water clapper adapted to close upon one of said seats, an arm pivotally associated with the casing upon which arm the water clapper is carried to and from its seat, an air clapper carried to and from its seat by said arm, a pivotal connection between said air clapper and said arm permitting the air clapper to tilt relatively to said arm and to said water clapper during the opening movement of said clappers, an abutment part upon the casing located adjacent to the air valve seat positioned to be engaged by the air clapper in its initial opening movement for tilting the air clapper relatively to said arm into a position to pass said part and said part positioned upon the casing to be engaged by the air clapper in the event of the return movement of the clappers toward said seats, and prevent the clappers from reseating by the action of a downward pressure upon said clappers.

13. A dry pipe valve comprising a casing having an inlet opening and an outlet opening, an air valve seat surrounding said inlet opening, a water valve seat surrounding the inlet opening, a water clapper adapted to close upon said water valve seat, an air clapper, a flexible valve ring upon the air clapper adapted to close upon the air valve seat, an arm pivotally mounted upon the casing upon which said clappers are movable to and from said seats when the arm is moved, a pivotal connection between said air clapper and the free end of said arm positioned eccentrically relatively to the center of the air clapper, an abutment part located upon the casing adjacent to the air valve seat and positioned diametrically opposite to the pivot point of the arm relatively to the air valve seat and in alignment with the pivot point of the arm and said pivotal connection between the arm and the air clapper, said air clapper having a part thereof positioned between said abutment part and the air valve seat when located adjacent to the air valve seat and opposed by said abutment part in opposition to a movement away from the air valve seat whereby air pressure upon the air clapper will tilt the latter about said part and move the arm and the water clapper toward the water valve seat, and said abutment part located relatively close to the pivot point of the arm with the air clapper for tilting the air clapper upon the arm during the initial opening movement of the air clapper into a position to pass said part, and said abutment part positioned upon the casing to be engaged by said part upon the air clapper in the event of a return movement of the clappers toward said seats to prevent the reseating of the clappers.

14. A dry pipe valve comprising a casing having an inlet opening and an outlet opening, an air valve seat surrounding the inlet opening, a water valve seat surrounding the inlet opening, a rigid lever arm pivoted to the casing between said seats, an air clapper pivoted directly to the arm and movable therewith to and from the air valve seat when the arm is moved, said arm crossing the water valve seat between its pivotal connections with the casing and the air clapper, said pivotal connection between the free end of the arm and the air clapper being positioned upon the opposite side of the center of the air clapper relatively to the pivot point of the arm with the casing, an abutment part located upon the casing adjacent to said air valve seat and diametrically opposite to the pivot point of the arm upon the casing, a shoulder upon the air clapper located adjacent to the pivotal connection of the air clapper with the arm adapted to occupy a position between said abutment part and the air valve seat when the air clapper is adjacent to the air valve seat and abutting against said abutment part, said shoulder engaged by said abutment part during the initial opening movement of the air clapper for tilting the latter into a position relatively to the arm and the abutment part to prevent a return movement of the air clapper toward the air valve seat, a bearing upon the medial portion of said arm, a bolt adjustably mounted in said bearing, a water clapper adapted to close upon the water valve seat, a pivot connection between said bolt and the water clapper, and a finger upon the air clapper adated to engage said bearing and limit the tilting movement of the air clapper relatively to the arm.

In testimony whereof I affix my signature.

WILLIAM B. GRIFFITH.